(12) United States Patent
Van Der Houwen et al.

(10) Patent No.: US 8,946,370 B2
(45) Date of Patent: Feb. 3, 2015

(54) POLYMER COMPOSITION, METHOD FOR APPLYING SUCH COMPOSITION AND USE OF SUCH COMPOSITION IN RAILWAY TRACK STRUCTURES

(75) Inventors: Gerrit M. Van Der Houwen, Haarlem (NL); Pieter J. Kerkhoven, Heemstede (NL); Stefanus J. M. Koteris, Hilversum (NL)

(73) Assignee: edilon)(sedra B.V., Haarlem (NL)

( * ) Notice: Subject to any disclaimer, the term of this patent is extended or adjusted under 35 U.S.C. 154(b) by 37 days.

(21) Appl. No.: 13/701,094

(22) PCT Filed: Jun. 1, 2011

(86) PCT No.: PCT/EP2011/059073
§ 371 (c)(1),
(2), (4) Date: Dec. 12, 2012

(87) PCT Pub. No.: WO2011/151389
PCT Pub. Date: Dec. 8, 2011

(65) Prior Publication Data
US 2013/0087566 A1    Apr. 11, 2013

(30) Foreign Application Priority Data

Jun. 1, 2010 (EP) ..................... 10164586

(51) Int. Cl.
| | |
|---|---|
| C08G 77/08 | (2006.01) |
| C08L 71/00 | (2006.01) |
| C08G 65/336 | (2006.01) |
| C08J 3/24 | (2006.01) |
| C08L 71/02 | (2006.01) |
| E01B 19/00 | (2006.01) |
| B65D 13/00 | (2006.01) |

(52) U.S. Cl.
CPC ............ *C08L 71/00* (2013.01); *C08G 65/336* (2013.01); *C08J 3/24* (2013.01); *C08L 71/02* (2013.01); *E01B 19/003* (2013.01); *B65D 13/00* (2013.01); *Y10S 528/901* (2013.01)
USPC ............................................. 528/18; 528/901

(58) Field of Classification Search
CPC ....................... C08L 71/02; E01B 19/003
USPC .................................................. 528/18, 901
See application file for complete search history.

(56) References Cited

U.S. PATENT DOCUMENTS

| | | | |
|---|---|---|---|
| 3,971,751 A | 7/1976 | Isayama et al. | |
| 5,041,517 A | 8/1991 | Vu et al. | |
| 5,731,039 A | 3/1998 | Suzuki et al. | |
| 6,025,416 A | 2/2000 | Proebster et al. | |
| 7,652,119 B2 * | 1/2010 | Wakabayashi et al. | ......... 528/36 |
| 2004/0209972 A1 | 10/2004 | Chambers et al. | |
| 2006/0257671 A1 | 11/2006 | Yahkind | |
| 2007/0060732 A1 | 3/2007 | Yang et al. | |
| 2007/0088110 A1 | 4/2007 | Kohl et al. | |
| 2007/0265409 A1 | 11/2007 | Wakabayashi et al. | |
| 2008/0237535 A1 * | 10/2008 | Maejima et al. | ............. 252/79.1 |

FOREIGN PATENT DOCUMENTS

| | | |
|---|---|---|
| CN | 1950477 | 4/2007 |
| CN | 101056946 A | 10/2007 |
| DE | 195 17 452 A1 | 11/1996 |
| EP | 0 131 883 | 1/1985 |
| EP | 211 461 | 2/1987 |
| EP | 520 426 | 4/1996 |
| EP | 1 743 008 | 1/2007 |
| JP | 56-57868 | 5/1981 |
| JP | 2001-172610 | 6/2001 |
| WO | WO 96/35761 | 11/1996 |
| WO | WO 2004/078365 A1 | 9/2004 |
| WO | WO 2005/108520 A1 | 11/2005 |
| WO | WO 2008/040549 | 4/2008 |
| WO | WO 2011/151389 A1 | 12/2011 |

OTHER PUBLICATIONS

Wikipedia (http://en.wikipedia.org/wiki/Curing_(chemistry)) Date unknown.*
Ferry "Viscoelastic Properites of Polymers" $3^{rd}$ Ed., John Wiley & Sons, Inc, (1080) pp. 404.*
State Intellectual Property Office of China, First Office Action, dated Jan. 13, 2014, for copending Chinese application.
Australian Government IP Australia, Patent Examination Report No. 1, dated Nov. 8, 2013, for copending Australian application.
PCT International Search Report, PCT/EP2011/059073, dated Aug. 4, 2011.
PCT Written Opinion of the International Preliminary Examining Authority, PCT/EP2011/059073 dated Feb. 2, 2012.
Chinese Copending Patent Application No. 201180031789.1, text of second office action English translation.

* cited by examiner

*Primary Examiner* — Kuo-Liang Peng
(74) *Attorney, Agent, or Firm* — TraskBritt, P.C.

(57) ABSTRACT

A polymer composition comprises a) a component 1 comprising a silane-terminated prepolymer; and b) a component 2 comprising water; and c) a component 3 comprising a silanol condensation catalyst. The composition is packaged in at least two separate packages prior to application, wherein no package contains all three components 1 and 2 and 3. In the composition water is present in an amount of 0.01 to 10 pbw per 100 pbw of prepolymer present in the composition, and the apparent viscosities of each of the packages is at most 95 Pa·s (Brookfield viscosity (A/6/10)) according to ISO 2555 at 23° C. The composition may suitably applied to railway track structures for the dampening of noise and vibrations of rails.

19 Claims, 2 Drawing Sheets

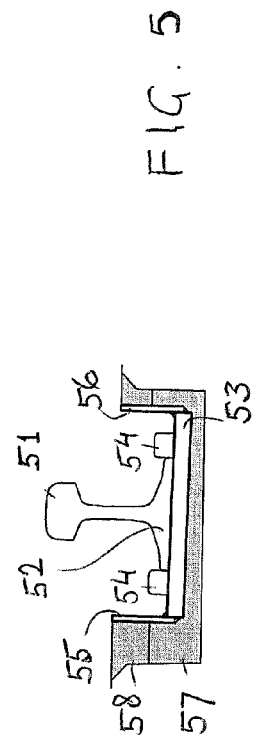
FIG. 1
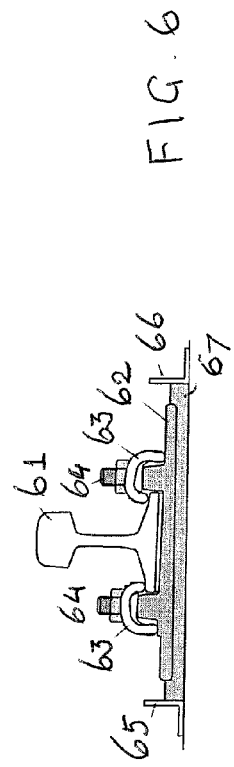
FIG. 2
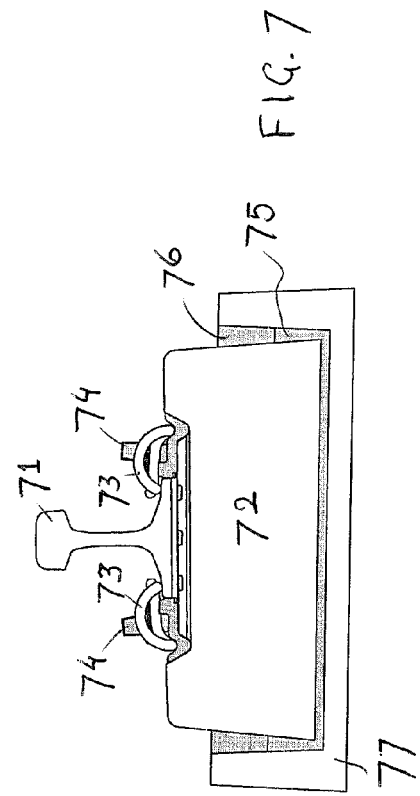
FIG. 3
FIG. 4
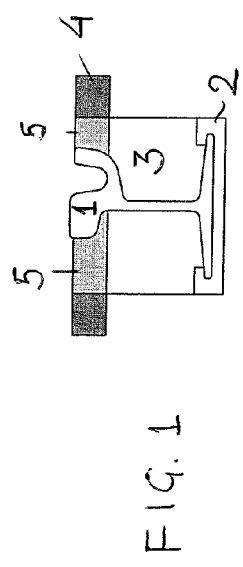
FIG. 5
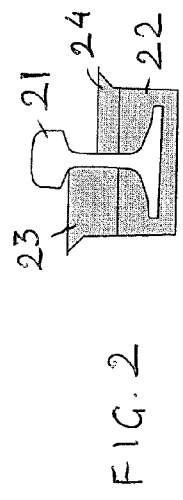
FIG. 6
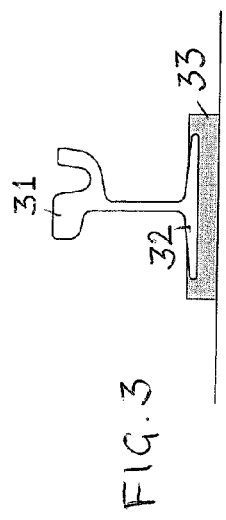
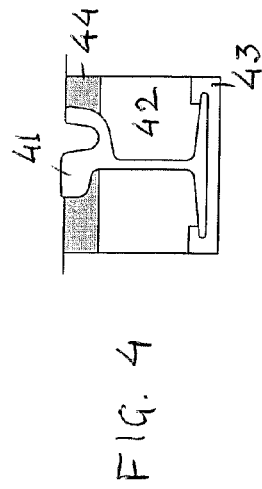
FIG. 7

POLYMER COMPOSITION, METHOD FOR APPLYING SUCH COMPOSITION AND USE OF SUCH COMPOSITION IN RAILWAY TRACK STRUCTURES

The present invention relates to a polymer composition, a method for applying such composition and the use of such composition in railway track structures. In particular, the invention relates to a polymer composition wherein a silane-terminated prepolymer has been included.

It is known that railway track structures can be embedded in a polymer composition to dampen vibration and noise. Such a composition has been described in, e.g., DE 40 36 124. This document describes a noise reduction device for rail traffic systems which comprises a profile body of polyurethane, incorporating lead or equivalent damping material, pressed into the cavity between the top of the rail foot and the bottom and side faces of the rail head. The polyurethane component in such applications may contain various fillers. In DE 40 04 208 a system is described wherein rail recesses are filled with pre-moulded bar-shaped components. The pre-moulded bars have been manufactured from a composition containing scrapped rubber and polyurethane. Also EP 211 461 discloses a railway wherein rails find support via elastic supporting layers against rigid supporting layers. In this way the rails are embedded in a body of elastic material, in particular polyurethane. Another railway track structure wherein polyurethane is being used, has been described in WO 2008/040549 which discloses a rail that is fastened to a support block. Between the support block and the supporting structure a prefabricated resilient member is placed in order to reduce the noise and vibration of trains and trams running over the rails. The member is made from, e.g., polyurethane.

The polyurethane compounds provide satisfactory noise- and vibration-dampening properties. Their manufacture involves polyols and isocyanates. In the manufacture of polyurethanes the polyurethane is supplied as a two-component composition, wherein the isocyanates, such as methylene diphenylisocyanate and toluene diisocyanate prepolymer, on the one hand and the polyols on the other hand are provided in separately packed containers or kits. An example of such a polyurethane composition has been described in U.S. Pat. No. 5,041,517. Since the isocyanates react more quickly with water than with the polyol the application of polyurethane in railway track structures in the open may be hampered by moisture, e.g., from weather conditions, like rain, fog or high humidity, or on wet substrates.

Therefore, it would be advantageous to develop another polymer composition that can suitably be used in railway track structures that would not have this disadvantage.

U.S. Pat. No. 3,971,751 discloses a composition comprising a polyether having silicon end groups, which composition is changeable to a rubber-like substance upon exposure to atmospheric moisture at room temperature. The polymer is usually cured by atmospheric moisture. However, it is also possible to add additional moisture to accelerate curing. When moisture or water is added two-component systems may be employed. Systems with this type of polymer have found use as adhesives and/or sealants, as may be apparent from EP 824 574 and EP 1 743 008. In EP 824 574 a two-component sealant composition has been described that is based on silane-terminated polyether prepolymer wherein a first component comprises a moisture-curing prepolymer sealant with high initial adhesiveness and a second component that is a cross-linking agent and/or accelerator for the prepolymer. The high initial adhesiveness is obtained by using a highly viscous pasty adhesive or sealant composition which is capable of curing rapidly upon exposure to moisture. EP 1 743 008 also discloses a two-component sealant composition with a first component comprising a silane-terminated prepolymer, a cross-linking catalyst and low-molecular weight silanes that are to promote adhesion, and a second component that comprises water and water-absorbing thickeners, and, optionally, also silane-terminated polyether prepolymer. Both components in this known composition are pasty. The stated advantage of the two-component sealant over a one-component system is that bonds between nonporous substrates cure rapidly largely irrespective of the air humidity. The resultant assembly of substrates that are bonded together with this composition may quickly be further processed and/or transported without further mechanical fixing. Both these compositions may be used as adhesives and/or sealants, e.g., for seam sealing purposes.

Surprisingly, it has now been found that silane-terminated prepolymer compositions with relative low viscosities can be used in railway track structures, thereby overcoming the application disadvantages of polyurethanes.

Accordingly, the present invention provides a polymer composition comprising:

a) a component 1 comprising a silane-terminated prepolymer; and b) a component 2 comprising water; and c) a component 3 comprising a silanol condensation catalyst, which composition is packaged in at least two separate packages prior to application, wherein no package contains all three components 1 and 2 and 3, in which composition water is present in an amount of 0.01 to 10 pbw per 100 pbw of prepolymer present in the composition, and wherein the apparent viscosity of each of the packages is at most 95 Pa·s (Brookfield viscosity (A/6/10)) according to ISO 2555 at 23° C.

Due to the relatively low viscosities of the components in the packages the invention provides after mixing a pourable composition, which flows very well and wherein the initial adhesiveness is relatively low so that the composition may be applied in the destined location. The application in railway track structures may take some time so that it should be avoided that curing takes place too rapidly. This relatively slow curing is achieved by the present composition. Further, since the composition provides water as the curing medium within the composition, when mixed, the curing takes place uniformly throughout the mixed composition. The skilled person will realise that the pasty components of the rapidly-curing compositions of EP 824 574 and EP 1 743 008 are not suitable for such applications, since these compositions are too viscous and cure too rapidly to be able to be applied to the locations that are relatively difficult to be reached. When the components are mixed and applied on a wet surface, the resulting composition does not foam and the composition adheres to the wet substrate, even under water. The composition has the additional advantages that it has excellent electrical insulation properties. It further has very good temperature stability and durability and retains its elasticity over a wide temperature range, including temperatures below freezing temperatures, e.g., −20° C. Further, the material can be easily recycled.

Therefore, the present invention also provides a method for applying a polymer composition which process comprises the steps:

i) mixing a polymer composition comprising a) a component 1 comprising a silane-terminated prepolymer; and b) a component 2 comprising water; and c) a component 3 comprising a silanol condensation catalyst, which composition is packaged in at least two separate packages, wherein no package contains all three components 1 and 2 and 3,
in which composition water is present in an amount of 0.01 to 10 pbw per 100 pbw of prepolymer present in the composition, and
wherein the apparent viscosity of each of the packages is at most 95 Pa·s (Brookfield viscosity (A/6/10)) according to ISO 2555 at 23° C., to obtain an uncured mixture;
ii) applying a layer of the uncured mixture to at least one substrate; and
iii) allowing the layer of uncured mixture to cure.

Curing of these compositions is relatively slow and may take several minutes, e.g., from 2 to 120 min. The duration of the curing may also depend on the temperature of the uncured mixture, on the temperature of the substrates, on the nature and concentration of the silanol condensation catalyst and on the concentration of water.

In another aspect, the present invention provides the use of the above-described composition in railway track structures.

The components 1, 2 and 3, are separately packaged in at least two packages. Hence it is feasible to provide a composition consisting of three or more packages. The packages may contain separately component 1, component 2 and component 3. However, as will be explained below, the relative amounts of the components in the composition may vary significantly. When the three components are packaged in three or more packages, the mixing in the most desired ratio may be rendered unnecessarily difficult. Therefore, it is preferred to provide a present polymer composition in a version which comprises
a) a component A comprising the silane-terminated prepolymer; and
b) a component B comprising water and/or the silanol condensation catalyst,
wherein if component B contains one ingredient selected from water and silanol condensation catalyst, component A comprises at least the other ingredient and wherein component A and component B are separately packaged prior to application.

In an especially preferred embodiment component A comprises silane-terminated prepolymer and water and component B comprises the silanol condensation catalyst and silane-terminated prepolymer, wherein component A and component B are separately packaged prior to application.

Component 1 or component A comprises a silane-terminated prepolymer. The polymer chain of the prepolymer between the silane groups may vary. For example, it is possible to apply a prepolymer wherein the polymer chain between the silane groups is constituted of a polyurethane residue, a polyolefin residue, a polyester, such as polyacrylate or polymethacrylate, e.g., poly methyl acrylate, poly ethyl acrylate, poly methyl methacrylate or poly ethyl methacrylate, polyether, and mixtures thereof. Preferably, the silane-terminated prepolymer comprises a silane-terminated polyether prepolymer. In addition to the already mentioned advantages with relation to the composition in general, the polyether-based prepolymer has the additional advantage that in case of fire or when rails are welded or cut, the material will not release hydrogen cyanide, as might be the case when polyurethane is used in railway track structures. Such a prepolymer may consist of a polyether backbone and silyl terminal groups. The silyl group comprises hydroxyl groups and hydrolysable groups. Such hydrolysable groups include halogen, alkoxy, acyloxy, amino alkyl-dialkoxy. More groups have been described in U.S. Pat. No. 3,971,751. More preferably, the prepolymer comprises alkyl-dialkoxy silyl end groups, more in particular, methyl-dimethoxy silyl end groups. The number of terminal silyl end groups per prepolymer molecule may be as high as twelve. Numbers higher than two ensure that cross-linking between de prepolymer chains may occur which enhances the strength of the cured product. Alternatively, cross-linking agents may be added or at least part of the prepolymers comprise three or more arms, at the end of which one or more silane groups are present. The polyether backbone is preferably built up from alkoxy units consisting of a linear or branched alkylene group of 2 to 6 carbon atoms and an oxygen radical. The number average molecular weight of the prepolymer may vary within ranges. Advantageously, the number average molecular weight of the prepolymer ranges from 500 to 50,000, preferably, from 2,000 to 10,000. When the molecular weights are higher, the viscosity may become undesirably high, whereas at lower molecular weight the elasticity of the eventual cured mixture becomes relatively low. A suitable process for producing the prepolymer has been described in U.S. Pat. No. 3,971,751.

The apparent viscosities of the packages are at most 95 Pa·s (Brookfield viscosity (A/6/10)) as determined via ISO 2555 at 23° C. The standard specifies a method for determining the apparent viscosities of a resins in a liquid or similar state using a rotational viscometer as described in the standard. The viscometers permit viscosity measurements from 0.02 to 60,000 Pa·s, albeit that for various viscosities a different spindle or a different rotational frequency is to be applied. Preferably, the apparent viscosity of each component is at least 0.02 Pa·s (Brookfield viscosity (A/1/100)) according to ISO 2555 at 23° C. This ensures that easy mixing is attainable. More preferably, the viscosity of each of the packages varies from 0.02 Pa·s (Brookfield viscosity (A/1/100)) to 50 Pa·s (Brookfield viscosity (A/6/10)), most preferably from 0.1 Pa·s (Brookfield viscosity (A/1/50)) to 50 Pa·s (Brookfield viscosity (A/6/10)) according to ISO 2555 at 23° C.

The amount of water in the composition can be selected by the skilled person dependent on the prepolymer used and the rate with which the composition is to be cured. The amount will suitably be from 0.01 to 10 pbw per 100 pbw prepolymer. Lower amounts slow down the curing rate and higher amounts may affect the strength of the cured product. Moreover, the uniformity of the curing process can be obtained better when the amount of water is within the ranges mentioned. Excellent results have been obtained by water amounts from 0.1 to 2.0 pbw per 100 pbw prepolymer.

The silanol condensation catalyst can be selected from a wide variety of known catalysts. U.S. Pat. No. 3,971,751 already discloses a number of suitable catalysts. Other suitable catalysts have been described in EP 520 426 and US 2007/0060732. Suitable examples as catalysts include alkyl titanate, such as tetrapropyl- or tetrabutyl titanate and titanium complexes, organo-silicon titanate; metallic salts of a carboxylic acid, in particular tin carboxylates, such as stannous octanoate, dibutyl tin laurate, dibutyl tin acetate and dibutyl tin maleate, tin naphthenate, tin alkoxylates or dibutyl tin alkoxylates, wherein the alkoxy groups have from 2 to 16 carbon atoms, carboxylate alkyl stannane, such as bisacetoxy dialkyl stannane, wherein the alkyl group may contain from 4 to 12 carbon atoms, and dibutyl tin acetylacetonate; reaction products of bismuth salts and carboxylic acids, e.g., bismuth tris(2-ethyl-hexanoate), bismuth tris(neodecanoate); organic zinc compounds, in particular zinc carboxylates, such as zinc octanoate, amino compounds, such as morpholine, N-methyl morpholine, 2-ethyl-2-methylimidazole, 1,8-diazabicyclo (5.4.0)undec-7-ene, dibutyl amine-2-ethyl hexoate; and other acidic or basic catalysts which are known to be effective for silanol condensation reaction. Mixtures of suitable catalysts may also be used. Tin carboxylate is preferred, and a combination of tin carboxylate and a bismuth carboxylate is especially preferred The amount of catalyst used for curing may range from 0.01 to 10 pbw per 100 pbw prepolymer. Too small amounts will undesirably slow down the curing reaction. If higher amounts are used, local hot spots may be created which may incur gas formation and foaming. The formation of foam effects the strength of the cured product.

If desired the adhesion and curing rate may be influenced by the addition of low molecular weight alkoxysilane compounds, such as, for example, 3-glycidoxypropyl trialkoxysilane, 3-acryloxypropyl trialkoxysilane, 3-aminopropyl trialkoxysilane, 1-aminoalkyl trialkoxysilane, vinyl trialkoxysilane, α-methacryloxymethyl trialkoxysilane, N-aminoethyl-3-aminopropyl trialkoxysilane, N-aminoethyl-3-aminopropylmethyl dialkoxysilane, phenylaminopropyl trialkoxysilane, aminoalkyl trialkoxysilane, i-butyl methoxysilane, N-(2-aminoethyl)-3-aminopropyl trialkoxysilane or mixtures thereof. In the above compounds, the alkoxy groups are suitably $C_{1-6}$ alkoxy groups, more preferably, $C_{1-4}$ alkoxy groups. Instead of the trialkoxysilane compounds mentioned above, the corresponding dialkoxysilane analogues may also be used, in which case an alkoxy group is replaced by a non-functional $C_{1-8}$ alkyl group. In addition, low molecular weight oligoalkoxysilanes of the above-mentioned low molecular weight alkoxysilane compounds oligomerized through the alkoxy group may be used. Mixtures of the low molecular weight alkoxysilane compounds mentioned above may also be used.

In railway track structures it is not uncommon to use fillers and other additives in the polymer compositions that are employed to dampen noise and vibrations. Also in the present invention fillers and additives are suitably used. It is an option to add the fillers and/or additives separate from the components 1, 2 and 3, or A and B to the uncured mixture. Advantageously, in one or more of the packages of the composition according to the present invention one or more fillers and other additives may be comprised. One very suitable filler includes microspheres. A microsphere in this application refers to a hollow body composed of organic or inorganic material having a diameter of 1 mm or less, preferably 500 µm or less. The advantage of these microspheres resides in that the cured product improves on elasticity compared to a product whereto no microspheres have been added. The density of the microspheres suitably ranges from 0.01 to 0.9 $kg/dm^3$, preferably from 0.1 to 0.5 $kg/dm^3$. The amount of microspheres that is added to the composition may be varied in accordance with the elasticity desired. Generally, the amount of microspheres will be selected from 0.01 to 100 pbw, preferably from 0.1 to 50 pbw, more preferably from 0.3 to 40 pbw per 100 pbw of prepolymer. As indicated above, the microspheres may have been made from inorganic or organic material. Suitable microspheres are silas balloons (hollow microspheres made of volcanic ash), pearlite, glass balloons, silica balloons or fly ash balloons, alumina balloons, zirconia balloons or carbon balloons. Suitable organic materials for the manufacture of hollow microspheres include phenolic resin, epoxy resin or urea, polystyrene, polymethacrylate, polyvinylalcohol, or styrene-acrylate polymer or vinylidene chloride polymer. Further, certain microspheres may have their surface coated with thermosetting resins.

Another suitable filler material is constituted by cork particles and organic or inorganic fibres. The organic fibres may be synthetic, e.g., polyester or polyamide fibres, but also natural fibres may be used such as flax fibres. The filler material may also contain other polymers such as polystyrene, polyurethane, polyolefins, like polyethylene or polypropylene. The fillers may also be recycled material. A very suitable recycled material is rubber granules, e.g., from granulated tyres. Suitable inorganic fillers include glass fibres. The density of these fillers suitably ranges from 0.1 to 1.0 $kg/dm^3$.

A very preferred filler includes cork particles, silica balloons, glass balloons and mixtures thereof. When such fillers are present, they may be present in any one or more of the components.

The composition may also contain various fillers with a density greater than 1 $kg/dm^3$, which fillers are suitably effective to reinforce the resulting cured polymer composition, such as fume silica, precipitated silica, silica aerogel, carbon black, calcium carbonate, magnesium carbonate, diatomaceous earth, dolomite, clay, talc, titanium oxide, ferric oxide, zinc oxide, glass spheres and other filaments. Another suitable filler that promotes the stiffness of the cured product is aggregate, i.e. coarse particulate material including sand, gravel, crushed stone, slag and recycled concrete. The composition with aggregate provides a stable foundation in railway track structures whilst retaining the elasticity. Mixtures of the fillers may also be used.

Aggregates have a density above 1 $kg/dm^3$. They are particularly useful in compositions that also contain microspheres. Due to the presence of the microspheres the density of the combination of microspheres and prepolymer might be below 1 $kg/dm^3$. When such a combination is poured into a mould, e.g., the cavities and gaps in a railway structure, one runs the risk that water from the environment may be entrapped under the composition, thereby negatively affecting the load bearing capacity of the railway track structure. By adding aggregate to the composition, not only the stiffness of the cured product is promoted, but also the density of the resulting composition is enhanced, so that this density is above 1 $kg/dm^3$. This ensures that the composition will force water that may be present in the cavities and gaps of a railway track structure, out of these cavities and gaps so that the load bearing capacity of the railway track structure is guaranteed. When the density of the uncured mixture is above 1 $kg/dm^3$, the static pressure in the cavities and gaps of the railway track structure is larger, so that the uncured mixture flows better under any obstructions that may be present therein. Water is forced out which ensures that no water is present, which could jeopardise electrical insulation and also ice formation at freezing conditions, which could damage the structure.

Although these fillers may also be added separately, it is suitable to include the fillers in the packages of the composition according to the present invention. The fillers with a density above 1 $kg/dm^3$ may be present in any one or more of the components.

The amount of fillers can be determined by the skilled person along his wishes. The amount may also depend on the presence of other additives and microspheres in the composition. Suitably, the amount of filler with a density above 1 $g/cm^3$ ranges from 0 to 300 pbw per 100 pbw of prepolymer.

Advantageously, the density of the uncured mixture after mixing of the packages ranges from 0.5 to 2.5 $kg/dm^3$.

The composition according to the invention may also contain one or more plasticizers to improve elongation properties of the cured product or to enable to incorporate a larger amount of fillers. For instance, the following plasticizers may be used alone or in combination of two or more: phthalate esters such as dioctyl phthalate, dibutyl phthalate or butylbenzyl phthalate; aliphatic dibasic acid esters such as dioctyl adipate, isodecyl succinate or dibutyl sebacate; glycol esters such as diethylene glycol dibenzoate, or pentaerythritol ester; aliphatic esters such as butyl oleate or methyl acetyl ricinoleate; phosphate esters such as tricresyl phosphate, trioctyl phosphate or octyldiphenyl phosphate; alkylsulphonic acid esters, such as the phenol ester of alkyl sulphonic acid whereon the alkyl group contains from 8 to 25 carbon atoms, in particular alkane($C_{10-21}$)sulphonic acid phenyl esters (sold as Mesamoll ex Lanxess), epoxy plasticizers such as epoxydized soybean oil or benzyl epoxy steareate; polyester plasticizers such as polyesters resulting from dibasic acids and divalent alcohols; polyether polyols such as polypropylene glycol and its derivatives; polystyrenes such as poly-α-methylstyrene or polystyrene; and other plasticizers such as polybutadiene, butadiene-acrylonitrile copolymer, polychloroprene, polyisoprene, polybutene or chlorinated paraffin. Plasticisers are usually used in an amount of from 0 to 150 pbw per 100 pbw of prepolymer. The plasticisers may be comprised in any one or more of the packages.

In addition to the fillers, plasticisers and silanol condensation catalysts, various additives including adhesion imparting agents such as phenol resin or epoxy resin, pigments, antioxidants, or UV-absorbing agents may be added as needed.

Any one or more of the packages further suitably comprises one or more stabilizers. Especially when component B comprises filler material, such stabilisers add in preventing the sagging of such filler materials. Stabilisers are particularly useful when the component to which they are added, also comprises water. Water can be adsorbed onto inorganic stabilisers or dissolved in organic stabilisers. Commonly stabilisers are water-soluble polymers or inorganic stabilisers. Examples of organic natural stabilisers are agar agar, carrageen, tragacanth, gum arabic, alginates, pectins, polyoses, guar flour, starch, dextrins, gelatine, casein. Examples of organic fully or partly synthetic stabilisers are carboxymethyl cellulose, cellulose ethers, hydroxyethyl cellulose, hydroxypropyl cellulose, poly(meth)acrylic acid derivatives, polyvinyl ether, polyvinyl alcohol, polyamides, polyimines. Examples of inorganic stabilisers or adsorbents for the water are polysilicic acids, highly disperse, pyrogenic hydrophilic silicas, clay minerals, such as montmorillonite, kaolinite, halloysite, aluminium hydroxide, aluminium oxide hydrate, aluminium silicates, talcum, quartz minerals, magnesium hydroxide or the like. These stabilisers may also have a thickening effect. This may be particularly useful when it is desirable to enhance the viscosity of the component in question. Such may be the case when one would want to make the viscosities of the packages more similar in order to facilitate the mixing of the components.

When component B as defined above does not comprise both water and a silanol condensation catalyst, component B preferably also contains silane-terminated prepolymer. Thereby the volume of component B is being brought more into line with that of component A. It would be advantageous to provide formulations of component A and component B such that the eventual mixing ratio may vary between 100:5 to 5:100 w/w, preferably from 100:10 to 10:100 w/w, and more preferably from 100:50 to 100:100. In such cases the composition can easily adopt mixing and dosing mistakes during application. The risk to make significant mistakes in the mixing ratio between component A and component B is lowered.

Component A and component B can be prepared in any conventional manner as will be appreciated by the person skilled in the art. Suitably, the desired ingredients are mixed in the desired quantities. Such mixing can be done by using conventional mixing equipment.

As indicated above, the present invention also provides a method for applying the above composition. The composition according to the invention is advantageously being applied in a layer with a thickness of at least 5 mm. After mixing the packages, the resulting composition has such a viscosity that it can be easily poured into a gap, cavity, channel or mould to provide a layer of at least 5 mm. That yields a significant advantage over the known compositions of EP 1 743 008 and EP 824 574, which are so viscous and pasty that it is cumbersome to provide a thick layer over a relatively large surface area or in cavities and the like, which layer moreover must be cured uniformly. The relatively low viscosity of the composition according to the invention enables the handling of the uncured mixture so that a thick layer can be applied easily in moulds, cavities and the like. Moreover, the uniform distribution of the silanol condensation catalyst and water through the prepolymer ensures a uniform curing. The resulting cured product is elastic and has excellent adhesive strength. Preferably, the uncured mixture is applied in a layer of from 5 to 500 mm thick, more preferably, the layer of uncured mixture is applied in a thickness of from 10 to 300 mm.

The composition according to the present invention may be applied with or without the use of a primer. One may decide not to use a primer in the adhesion of the cured product to a non-porous surface, such as a steel, stainless steel, aluminium or polymeric surface. Also, since the adhesion of the composition according to the invention to asphalt is good one may use such a composition directly on asphalt surfaces. In all cases the adhesion is improved if all loose parts, dust and dirt, rust and other contaminants have been removed before the composition according to the invention is applied to the substrate. However, especially when the composition according to the present invention is applied to a concrete substrate it is advantageous to apply a primer onto the substrate first. Suitably the substrate is first pre-treated to ensure that the substrate is free from laitance, curing compounds, release agents and contaminations such as dirt, oil and grease. Suitable methods to carry out such pre-treatments include wet or dry blast cleaning and grinding. The primer can be selected from a range of commercial products. Suitable primers include commercial epoxy resin-based primers and isocyanate-based primers. Suitably, the primer comprises a polymer chain having at least one silicon-containing group comprising a silicon atom bonded to a terminal group which is a hydroxyl group or a hydrolysable group, such as an alkoxy, amino, mercapto or aminoxy group. The polymer chain is suitably composed of units selected from the group consisting of an alkyl acrylate and alkyl methacrylate, wherein the alkyl group contains from 1 to 30 carbon atoms, and mixtures thereof. Excellent primers have been obtained with polymer chains wherein units have been applied of alkyl acrylate or methacrylate with alkyl group having from 1 to 8 carbon atoms in combination with alkyl acrylate or methacrylate wherein the alkyl group contained at least 10 carbon atoms. The preparation of such primers has been disclosed in U.S. Pat. No. 5,731,039.

Since the composition can be cast or poured it is advantageous to pour the composition into a cavity or channel which is formed by one of the substrates to which the cured product is meant to adhere. Since the composition is self-levelling the top surface of the composition will be smooth and flat. A very suitable application is the use of the present composition in the manufacture of railway track structures. Therefore, the substrate into which the polymer composition is applied is preferably a steel or concrete channel encompassing a second substrate, namely a rail for a railroad, underground or tramway.

Accordingly, the present invention also provides use of the above-described composition in railway track structures, in particular in the use on the fixation of rails in railway track structures. In a preferred embodiment such use results in a rail that is embedded at three sides by the cured composition or in a body of the cured composition. This provides fixation, continuous support and insulation from vibrations and noise.

An alternative embodiment is the fixation of a concrete block on which rails have been fastened to a substrate, e.g., a concrete tray, bridge or tunnel, such that the concrete block is elastically fixed to the substrate, thereby providing isolation to noise and vibrations. Similar to the construction that has been disclosed in WO 2008/040549, the fixation of a polymeric tray in another polymeric tray is also possible so that a support is created for a concrete block.

A further alternative embodiment is the use in the production of steel or polymeric, e.g., polyamide, base plates that are cast in the composition according to the invention. Rails may subsequently be fastened to the base plates. The base plates may be fastened to the substrate, e.g., a road, tunnel or bridge.

Since the composition according to the present invention can easily be poured, the composition can also be used as filling material between a rail and a substrate surface, such as a road surface.

Alternatively, the space underneath a rail can be filled with the composition according to the present invention so that the rail is supported and dampened in a vertical direction.

The invention also provides a railway track structure which is obtainable via the process for applying a polymer composition according to the invention as described above. In particular, it provides a rail embedded in a body of a synthetic resin, wherein the synthetic resin is the cured composition as described above.

The invention will be further explained by means of the following Figures.

FIG. 1 shows a simplified cross-section of an embodiment of the invention wherein a joint is filled with the composition according to the invention.

FIG. 2 shows an alternative embodiment of the invention with a so-called embedded rail system.

FIG. 3 shows a further embodiment.

FIG. 4 shows another embodiment wherein the composition according to the invention is used to fill a joint.

FIG. 5 shows an alternative embodiment of an embedded rail system.

FIG. 6 shows a fastening system wherein the composition of the invention is used.

FIG. 7 shows an embedded block system.

Figure 8:
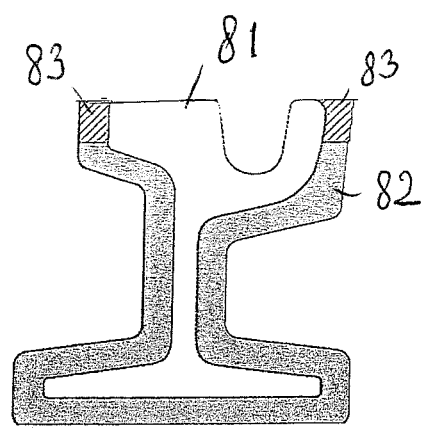
FIG. 8 shows a cross-section of a rail coated with a composition according to the invention.

Referring to FIG. 1 it shows a rail 1 that is lowered in a channel. The channel is located in, e.g., a road. The road is covered with an upper layer of asphalt 4. The rail is conventionally fixed using a first body of elastic material 2 and a second body of elastic material 3, thereby providing a strong fixation of the rail and satisfactory dampening of the noise and vibration when a train or tram runs over the rail. The material in bodies 2 and 3 may be the same or different and may consist of a polyurethane composition. Bodies 2 and 3 are only partly filling the channel to allow a gap under the surface of the road. This gap is filled by the composition according to the present invention, and the composition is allowed to cure to provide elastic bodies 5. In this way the composition combines the excellent adhesion to the asphalt layer 4 of the road and to the steel rail 1 with its properties of elasticity and strength. As to this Figure as well as regarding the other Figures it is observed that the adhesion can be improved by using a primer as discussed above. Also a pretreatment, such as removing dirt, oil or other contaminants, may improve the adhesive strength.

In FIG. 2 a rail 21 is placed into a channel that has been provided for the rail. The rail is fixed in its desired position. The composition according to the present invention is mixed and poured into the channel such that the rails is partly covered. The composition is allowed to cure and an elastic body 22 is thus created. After curing of body 22 the channel is further filled with the present composition to provide elastic bodies 23 and 24. This embodiment is especially convenient when its is desired to have the rail embedded in elastic material at two different levels, as shown by the different levels of bodies 23 and 24. If such difference is not desired, it is also possible to fill the channel in one step so that only a body, similar to 22, is obtained, but in this case filling the entire channel. In a similar embodiment, a resilient elastic body has been incorporated under the foot of rail 21 and other polymeric bodies alongside rail 21 (not shown). These extra bodies may enhance the desired properties of the railway track structure.

To obtain the embodiment of FIG. 3, a mould is created (not shown) above which a rail 31 is located such that the rail 31, provided with a rail foot 32, does not touch the bottom of the mould. The remaining space is filled with a composition according to the invention and the composition is allowed to cure to provide an elastic body 33. The mould is removed and the rail with an elastic body 33 can be used in preparing railway tracks structures.

FIG. 4 is very similar to FIG. 1. In this embodiment there is no asphalt layer, but a channel has been provided in a concrete road (not shown), in which channel a rail 41 is fixed. Via elastic bodies 43 and 44 the rail 41 is fixed in the channel, similar to the rail system of FIG. 1. Since body 42 only partly fills the channel, the remaining joint is filled with a composition according to the invention, yielding an elastic body 44. The body 44 has excellent adhesion properties to the steel rail. Further, is also strongly bonds with the concrete of the road.

FIG. 5 shows a different version of an embedded rail system. In this embodiment a rail 51 contains a rail foot 52. The rail foot 52 is fastened to a tray 53 via connecting means 54. The tray 53 may be made from a variety of materials, such as iron or steel. The tray 53 comprises on each end side walls 55 and 56. When the system that is thus created, is lowered into a channel that is destined for the rail, a gap is formed between the side walls 55 and 56 and the walls of the channel. This gap is filled in one or more steps. In the embodiment of FIG. 5, the gap is filled in a first step with a layer of the present composition which after curing provides elastic body 57, followed by a second step to provide for a second body 58.

FIG. 6 shows a direct fastening system wherein a rail 61 is fastened to a base plate 62 via extensions 63 and hooks 64. It is evident that other fastening systems may also be applied. Two side walls 65 and 66 are provided to form a mould between them. The rail 61 with base plate 62 is lowered into this mould without touching the bottom. The gap thus created is filled with the composition according to the invention to yield an elastic layer 67.

FIG. 7 shows the use of the present invention in an embodiment, similar to those described in WO 2008/040549. It shows a rail 71 that is fastened to a block 72, usually made from concrete. Polymer concrete and other materials may also be used for the manufacture of the block. The rail is fastened by conventional means; in the Figure the fastening is accomplished by using fastening extensions 74 that are fixed to the block and hook 73 that fasten the lower part of the rail 71. The block is lowered into a tray 77 within a railway track structure. The gap that is formed in this way is filled in one or more steps with the composition according to the invention. In the embodiment according to the Figure the gap has been filled in two steps. In an alternative embodiment of the system of using blocks, resilient members are prefabricated from the composition according to the present invention, separate from the railway track and placed in its destined location. Their positioning may be done at the desired location in the same way as described in WO 2008/040549.

FIG. 8 shows a cross-section of a rail 81 that is for a major part covered with a layer 82 made from the composition according to the present invention. The rail 81 with the layer 82 is prefabricated. When this rail is placed at its destined position, it is positioned in a channel without touching the walls of the channel. Concrete is cast underneath and alongside the rail 81, thus forming a railway track structure. The layer 82 that may be rather thick, provides noise and vibration damping. Alternatively, the layer 82 is thinner and applied by spraying the composition according to the present invention on rail 81. This fast curing layer 82 provides electrical insulation and corrosion resistance. The rail 81 is mechanically fixated to a surface. At the top of the rail two elastic bodies 83 may be applied, which have skid resistance properties.

The invention will be further illustrated by means of the following example.

EXAMPLE

A component A and a component B was prepared by mixing ingredients in amounts that are shown in Table 1. The silane-terminated prepolymer was a polyether terminated with silyl groups, obtained from Kanegafuchi. The silanol condensation catalyst was a blend of the tetraethyl ester of silicic acid ($H_4SiO_4$) with bisacetoxy dioctylstannane.

TABLE 1

Composition

| Ingredient | Component A Amount (pbw) | Component B Amount (pbw) |
|---|---|---|
| Silane-terminated prepolymer | 24.00 | 2.40 |
| Polyether polyol | 3.12 | 8.88 |
| Silanol condensation catalyst | 0.24 | — |
| Water | — | 0.12 |
| Vinyltrimethoxysilane | 0.48 | — |
| N-(2-aminoethyl)-3-aminopropyl trimethoxysilane | 0.36 | — |
| 3-Aminopropyltrimethoxysilane | 0.36 | — |
| Dolomite | 60.02 | — |

Component A had an apparent viscosity of 94 Pa·s (Brookfield viscosity (A/6/10) at 23° C. according to ISO 2555. The skilled person will realise that the value of the apparent viscosity depends on the method used. For instance, the dynamic viscosity of the above sample of Component A, as measured according to ASTM D 6267, amounted to 133,000 cP (133 Pa·s). The apparent viscosity of component B was 0.79 Pa·s (Brookfield viscosity (A/1/10) at 23° C. according to ISO 2555.

The components were mixed to yield an uncured mixture. The uncured mixture was poured into a mould to give a layer with a thickness of 5 mm, which layer was allowed to cure. The uncured mixture stopped being processable after 20 minutes. The properties of the cured layer after 7 days were measured. The values found are shown in Table 2.

TABLE 2

Properties of cured product

| Property | Unit | | Method |
|---|---|---|---|
| Hardness | Shore-A | 50 | DIN 53505 |
| Tensile strength | MPa | 1.2 | ISO 37 |
| Elongation at break | % | 65 | ISO 37 |
| E-modulus | MPa | 2.2 | ISO 37 |
| Density | kg/dm$^3$ | 1.6 | DIN 53479 |

Comparative Experiment

In order to show the difference between the composition according to the invention and the ones according to EP 1743008, the viscosity of the components of two compositions according to EP 1743008 was determined. The measurements were done with the components A' containing at least one silane-terminated prepolymer, a catalyst and low-molecular silanes, and components B' and B", containing at least one silane-terminated prepolymer, water and a water-adsorbing compound. These components had the composition as shown in Table 3.

TABLE 3

Composition

| | Component | | |
|---|---|---|---|
| | Component A' % wt | Component B' % wt | Component B" % wt |
| Prepolymer S303H (1) | 34.50 | 53.00 | 53.00 |
| Prepolymer SAT 10 (2) | 10.00 | — | — |
| Alkyl sulphonic acid phenyl ester, Mesamoll, Bayer | 1.30 | — | — |
| Bis(2,2,6,6-tetramethyl-4-piperidyl) sebacate solution | 2.40 | — | — |
| Silicic acid, HDK N 20, Wacker | 1.87 | — | — |
| Calcium carbonate, Socal U1S1, Solvay | 41.23 | — | — |
| Carbon black, Monarch 580, Cabot | 1.00 | — | — |
| 3-aminopropyltrimethoxy silane | 5.80 | — | — |
| 3-glycidyloxypropyltrimethoxy silane | 1.40 | — | — |
| DBTB (di-n-butyl-dibutoxy tin) | 0.50 | — | — |
| Silikolloid P87 (silicic acid kaolin mixture) | — | 44.00 | 35.00 |
| Demineralised water | — | 3.00 | 12.00 |
| | 100.00 | 100.00 | 100.00 |

(1) dimethoxymethylsilyl-terminated polypropylene oxide ether, Kanegafuchi
(2) difunctional polypropylene oxide ether with terminal dimethoxymethylsilyl groups, Kanegafuchi The apparent viscosities were determined using the ISO 2555 method. The apparent viscosity of Component A' was 1200 Pa·s (Brookfield viscosity(A/7/2.5)) at 23° C., the apparent viscosity of Component B' amounted to >8000 Pa·s (Brookfield viscosity (A/7 10.5)) at 23° C., and the apparent viscosity of Component B" was 4100 Pa·s (Brookfield viscosity (A/7 10.5) at 23° C. None of the individual components A, B' and B" was pourable and therefore mixtures thereof were also not pourable.

These results clearly show the differences between the prior art compositions and the compositions according to the present invention.

The invention claimed is:
1. A method of fixating rail in railway track structures, the method comprising utilizing a polymer composition in the fixation of rail in railway track structures, wherein the polymer composition comprises:

a component 1 comprising a silane-terminated prepolymer;
a component 2 comprising water; and
a component 3 comprising a silanol condensation catalyst,
which composition is packaged in at least two separate packages prior to application, wherein no package contains all three components 1 and 2 and 3,
in which composition water is present in an amount of 0.01 to 10 pbw per 100 pbw of prepolymer present in the composition, and
wherein the apparent viscosity of each of the packages is at most 95 Pa·s (Brookfield viscosity (A/6/10)) according to ISO 2555 at 23° C.

2. The method of claim 1, wherein the polymer composition comprises:
   a) a component A comprising the silane-terminated prepolymer; and
   b) a component B comprising water and/or the silanol condensation catalyst,
   wherein if component B contains one ingredient selected from water and silanol condensation catalyst, component A comprises at least the other ingredient and wherein component A and component B are separately packaged prior to application.

3. The method of claim 2, wherein component A comprises silane-terminated prepolymer and water and component B comprises the silanol condensation catalyst and silane-terminated prepolymer, wherein component A and component B are separately packaged prior to application.

4. The method of claim 1, wherein the prepolymer comprises a silane-terminated polyether prepolymer.

5. The method of claim 1, wherein the viscosity of each of the packages ranges from 0.02 (Brookfield viscosity (A/1/100)) to 50 Pa·s (Brookfield viscosity (A/6/20)) according to ISO 2555 at 23° C.

6. The method of claim 1, wherein the amount of water in the composition ranges from 0.1 to 10 pbw per 100 pbw of prepolymer.

7. The method of claim 1, wherein the silanol condensation catalyst is a tin carboxylate or a combination of tin carboxylate and a bismuth compound.

8. The method of claim 1, wherein one or more of the packages comprise microspheres.

9. The method of claim 1, wherein one or more of the packages comprises cork particles and/or rubber granules.

10. The method of claim 1, wherein one or more of the packages contains a filler with a density greater than 1 kg/dm³.

11. The method of claim 1, wherein the density of the composition after mixing of the packages ranges from 0.5 to 2.5 kg/dm³.

12. The method of claim 1, wherein utilizing the polymer composition in the fixation of rail in railway track structures comprises:
   i) mixing the component 1, component 2, and component 3 to obtain an uncured mixture;
   ii) applying a layer of the uncured mixture to at least one substrate; and
   iii) allowing the layer of uncured mixture to cure.

13. The method of claim 12, wherein the uncured mixture is applied in a layer of a thickness of at least 5 mm.

14. Railway track structure, produced by a process comprising:
   i) mixing a polymer composition comprising
      a) a component 1 comprising a silane-terminated prepolymer;
      b) a component 2 comprising water; and
      c) a component 3 comprising a silanol condensation catalyst,
   which composition is packaged in at least two separate packages, wherein no package contains all three components 1 and 2 and 3,
   in which composition water is present in an amount of 0.01 to 10 pbw per 100 pbw of prepolymer present in the composition, and
   wherein the apparent viscosity of each of the packages is at most 95 Pa·s (Brookfield viscosity (A/6/10)) according to ISO 2555 at 23° C., to obtain an uncured mixture;
   ii) applying a layer of the uncured mixture to at least one substrate; and
   iii) allowing the layer of uncured mixture to cure.

15. The railway track structure of claim 14, wherein the silanol condensation catalyst is a tin carboxylate or a combination of tin carboxylate and a bismuth compound.

16. The railway track structure of claim 14, wherein the polymer composition comprises:
   a component A comprising the silane-terminated prepolymer; and
   a component B comprising water and/or the silanol condensation catalyst,
   wherein if component B contains one ingredient selected from water and silanol condensation catalyst, component A comprises at least the other ingredient and wherein component A and component B are separately packaged prior to application.

17. The railway track structure of claim 16, wherein
component A comprises silane-terminated prepolymer and water and
component B comprises the silanol condensation catalyst and silane-terminated prepolymer,
wherein component A and component B are separately packaged prior to application.

18. The railway track structure of claim 14, wherein the viscosity of each of the packages ranges from 0.02 (Brookfield viscosity (A/1/100)) to 50 Pa·s (Brookfield viscosity (A/6/20)) according to ISO 2555 at 23° C.

19. The railway track structure of claim 14, wherein the amount of water in the polymer composition ranges from 0.1 to 10 pbw per 100 pbw of prepolymer.

* * * * *